US011450931B2

(12) United States Patent
Xu

(10) Patent No.: US 11,450,931 B2
(45) Date of Patent: Sep. 20, 2022

(54) SECONDARY BATTERY, BATTERY MODULE, AND DEVICE FOR USING SECONDARY BATTERY AS POWER SOURCE

(71) Applicant: Jiangsu Contemporary Amperex Technology Limited, Jiangsu (CN)

(72) Inventor: Hu Xu, Jiangsu (CN)

(73) Assignee: Jiangsu Contemporary Amperex Technology Limited, Changzhou (CN)

( * ) Notice: Subject to any disclaimer, the term of this patent is extended or adjusted under 35 U.S.C. 154(b) by 0 days.

(21) Appl. No.: 17/547,273

(22) Filed: Dec. 10, 2021

(65) Prior Publication Data

US 2022/0115748 A1 Apr. 14, 2022

Related U.S. Application Data

(63) Continuation of application No. PCT/CN2020/086978, filed on Apr. 26, 2020.

(30) Foreign Application Priority Data

Mar. 18, 2020 (CN) .......................... 202010189392.6

(51) Int. Cl.
*H01M 50/529* (2021.01)
*H01M 50/502* (2021.01)

(52) U.S. Cl.
CPC ....... *H01M 50/529* (2021.01); *H01M 50/502* (2021.01); *H01M 2220/20* (2013.01)

(58) Field of Classification Search
CPC .......................... H01M 50/529; H01M 50/502
See application file for complete search history.

(56) References Cited

U.S. PATENT DOCUMENTS

| 2011/0039152 A1* | 2/2011 | Kim ...................... H01M 50/20 |
| | | 429/178 |
| 2018/0342723 A1* | 11/2018 | Kambayashi .......... H01G 11/80 |
| 2020/0295339 A1* | 9/2020 | Kwak ................. H01M 50/538 |

FOREIGN PATENT DOCUMENTS

| CN | 205406620 U | 7/2016 |
| CN | 106299447 B | 12/2018 |

(Continued)

OTHER PUBLICATIONS

The International search report for PCT Application No. PCT/CN2020/086978, dated Dec. 23, 2020, 18 pages.

(Continued)

*Primary Examiner* — Jimmy Vo
(74) *Attorney, Agent, or Firm* — East IP P.C.

(57) ABSTRACT

The present application discloses a secondary battery, a battery module, and a device using the secondary battery as a power source. The secondary battery includes: a casing; an electrode assembly disposed in the casing; a cap assembly; and a current collecting member including an adapting piece and a connecting component provided separately and connected with each other; the adapting piece connected with the electrode terminal of the cap assembly and including a guiding section; the connecting component including a current collecting section to be connected with the guiding section and a tab connecting section to be connected with the electrode assembly; and the connecting component has a rigidity less than that of the guiding section, so that deformation of the guiding section toward the electrode assembly can be reduced when a portion of the connecting component connected with the electrode assembly is bent with respect to the length direction.

14 Claims, 11 Drawing Sheets

(56) References Cited

FOREIGN PATENT DOCUMENTS

| | | |
|---|---|---|
| CN | 208368603 U | 1/2019 |
| CN | 208488923 U | 2/2019 |
| CN | 109428046 A | 3/2019 |
| CN | 209658320 U | 11/2019 |
| CN | 111048728 A | 4/2020 |
| EP | 3451415 A1 | 3/2019 |
| JP | 2018190510 A | 11/2018 |

OTHER PUBLICATIONS

The First Office Action for China Application No. 202010189392.6, dated Apr. 26, 2020, 5 pages.
The Second Office Action for China Application No. 202010189392.6, dated May 18, 2020, 4 pages.
The extended European search report dated May 3, 2022 for European Application No. 20917269.1, 9 pages.

* cited by examiner

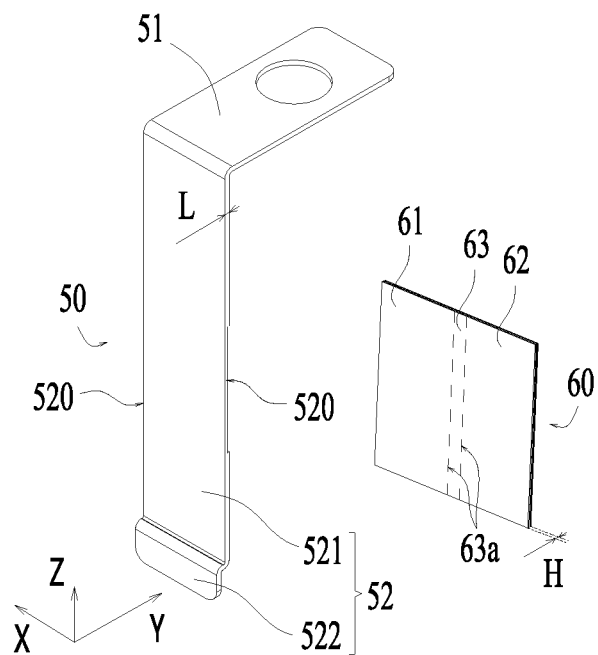
Fig. 6
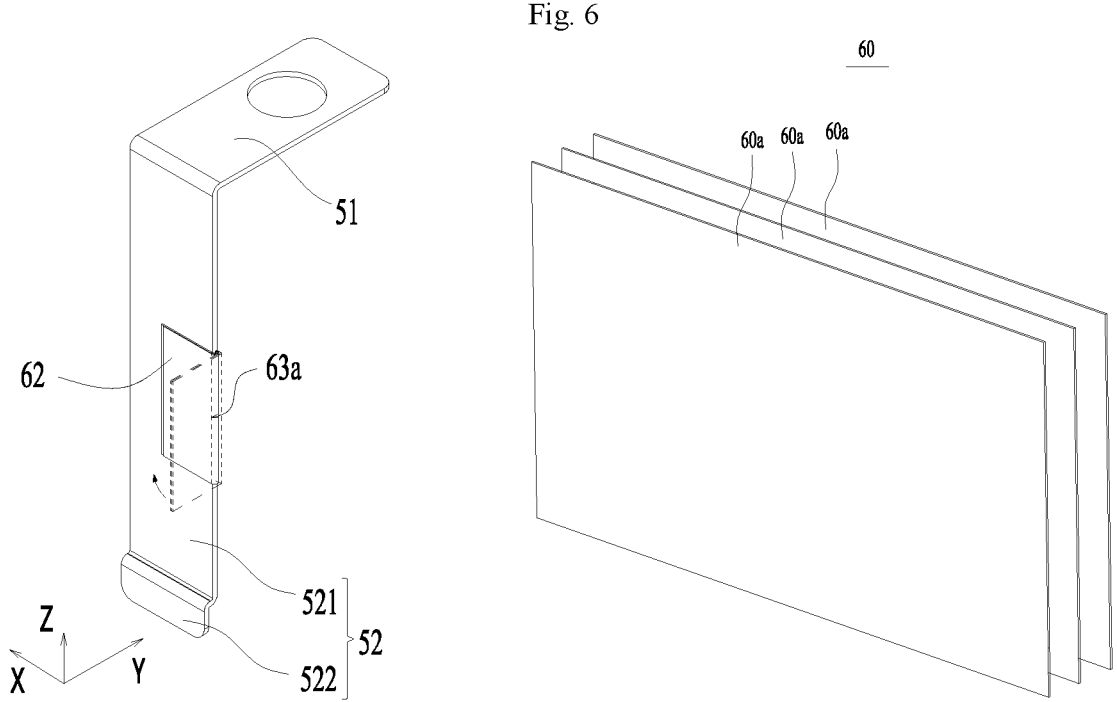
Fig. 7
Fig. 8

A-A

SECONDARY BATTERY, BATTERY MODULE, AND DEVICE FOR USING SECONDARY BATTERY AS POWER SOURCE

CROSS-REFERENCE TO RELATED APPLICATION

This application is a continuation of the International Application No. PCT/CN2020/086978, filed on Apr. 26, 2020, which claims priority to the Chinese patent application No. 202010189392.6, filed on Mar. 18, 2020, both of which are hereby incorporated by reference in their entireties.

TECHNICAL FIELD

The present application relates to the technical field of battery, and in particular to a secondary battery, a battery module, and a device for using a secondary battery as a power source.

BACKGROUND

With the development of society and science and technology, a secondary battery has been widely used to provide power for high-power devices, for example, electric vehicles. The secondary battery forms a battery module by connecting a plurality of battery cells in series or in parallel to achieve a large capacity or power.

The secondary battery is disposed with an electrode assembly for generating electric energy in a casing. The electrode assembly includes a positive electrode plate, a separator, and a negative electrode plate. The positive electrode plate and the negative electrode plate each includes a coated region and an uncoated region. The coated regions are wound or stacked to form a main body, and the uncoated regions are stacked to form a tab. The tab of the electrode assembly is connected with an electrode terminal through a current collecting member.

In the related technology known to the inventor, the current collecting member of the secondary battery is an integrally formed structure and adopts a bend structure, so as to improve reliability of welding to the tab by increasing its structural strength.

However, during actual use of the above secondary battery, it was found that after the current collecting member adopting the integrated structure is directly connected with the tab, a problem of poor electrochemistry performance and safety performance would be present.

SUMMARY

The present disclosure provides a secondary battery, a battery module, and a device for using a secondary battery as a power source. In the secondary battery, when a portion of the connecting component connected with the tab is bent, stress applied to the guiding section of the adapting piece is small, thereby reducing the deformation of the guiding section toward the main body and thus reducing the possibility of the film or powder of the electrode plate peeled off due to the squeezing of the guiding section on at least a portion of the main body.

In one aspect, the present disclosure provides a secondary battery including:
a casing; an electrode assembly, disposed in the casing and including a main body and a tab extending from the main body; a cap assembly, including a cap plate and an electrode terminal disposed on the cap plate, the cap plate connected with the casing; and a current collecting member, including an adapting piece and a connecting component, the connecting component and the adapting piece provided separately and connected with each other, the adapting piece connected with the electrode terminal, and the adapting piece including a guiding section, which is located on a side of the main body along a length direction of the secondary battery and extends along a direction perpendicular to the length direction; wherein the connecting component includes a current collecting section which is configured to be connected with the guiding section and a tab connecting section which is configured to be connected with the tab, the current collecting section is disposed between the guiding section and the main body, and the connecting component is configured to have a rigidity less than that of the guiding section, so that deformation of the guiding section toward the main body can be reduced when a portion of the connecting component connected with the tab is bent with respect to the length direction of the secondary battery.

According to the secondary battery of the embodiments of the present disclosure, the adapting piece and the connecting component adopt the connection manner in which they are separately provided and then assembled. For the adapting piece and the connecting component having different rigidities, the adapting piece and the connecting component may each be processed and manufactured individually and then connected and fixed to form the current collecting member. Since the connecting component is more easily deformed than the guiding section, external force acting on the guiding section by transmitting to the guide section through the tab connecting section is relatively small when the tab connecting section and the tab are bent together with respect to the length direction, thereby, during bending the tab connecting section, effectively reducing deformation degree of the guiding section toward the main body of the electrode assembly and reducing the deformation of the guiding section. In this way, the possibility of the guiding section being in contact with the main body and pressure being applied to at least a portion of the electrode plate of the main body is reduced, and the possibility of the film or powder of the electrode plate coated with an active material being peeled off due to the squeezing of the main body is further reduces, thereby improving the electrochemistry performance and safety performance of the secondary battery.

In another aspect, the present disclosure provides a battery module including the secondary battery according to the above embodiments.

In still another aspect, the present disclosure provides a device for using the secondary battery as a power source, and the device including the secondary battery according to the above embodiments.

DESCRIPTION OF THE DRAWINGS

Features, advantages, and technical effects of exemplary embodiments of the present disclosure may be described below with reference to the accompanying drawings.

FIG. 6 is a schematic exploded diagram of a structure of a current collecting member disclosed by an embodiment of the present disclosure;

FIG. 7 is a schematic diagram of a state in which a connecting component and an adapting piece are connected disclosed by an embodiment of the present disclosure;

FIG. 8 is a schematic exploded diagram of a structure of a connecting component disclosed by an embodiment of the present disclosure;

Figure 1:
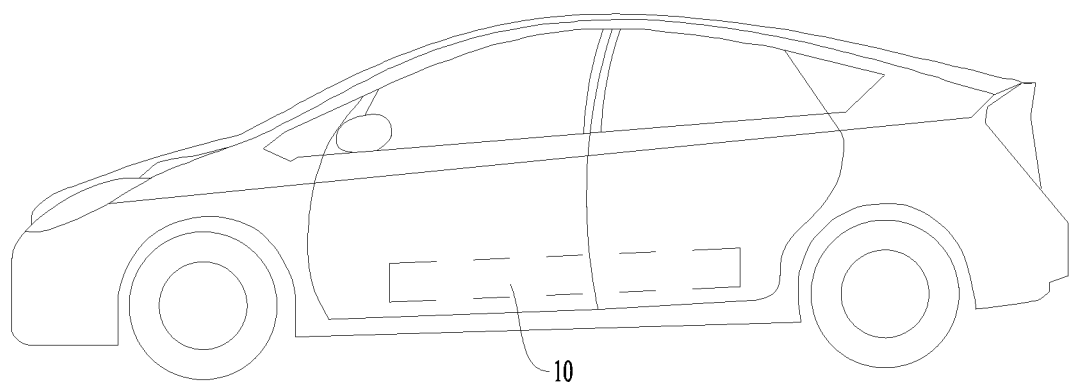
FIG. 1 is a schematic diagram of a structure of a vehicle disclosed by an embodiment of the present disclosure.

In the drawings, the drawings are not drawn to actual scale.

REFERENCE NUMBERS 1, vehicle;
10, battery pack;
20, battery group;
30, secondary battery; 31, casing; 32, electrode assembly; 321, main body; 322, tab;
40, cap assembly; 41, cap plate; 42, electrode terminal;
50, adapting piece; 51, terminal connecting section; 52, guiding section; 52a, branch; 520, edge portion; 521, first region; 522, second region;
60, connecting component; 60a, foil; 61, current collecting section; 62, tab connecting section;
63, bend section; 63a, boundary;
70, insulating component;
100, recess;
200, avoidance space;
300, weld portion;
X, thickness direction; Y, length direction; Z, height direction; W, axial direction.

DETAILED DESCRIPTION

Below, embodiments of the present disclosure may be further described in detail in combination with the drawings and embodiments. The following detailed description of the embodiments and the accompanying drawings are used to exemplarily illustrate the principles of the present disclosure and may not limit the scope of the present disclosure, that is, the present disclosure is not limited to the described embodiments.

In the description of the present disclosure, it should be noted that, unless otherwise stated, the meaning of "a plurality" is two or more; the orientation or positional relationship indicated by the terms "upper", "lower", "left", "right", "inner", "outer" and the like is merely for the purpose of describing the present disclosure and simplifying the description, and is not intended to indicate or imply that the device or element referred to must have a specific orientation, is constructed and operated in a specific orientation, and therefore cannot be understood to be a limitation of the present disclosure. Moreover, the terms "first", "second", "third" and the like are used for descriptive purposes only and cannot be understood to indicate or imply relative importance.

The orientation words present in the following description all indicate directions shown in the figures, and do not limit the specific structures of the disclosure. In the description of the present disclosure, it should also be noted that, unless otherwise specified and defined, the terms "install", "couple", and "connect" are to be understood broadly, and may be, for example, a fixed connection, a disassemble connection, or an integral connection; they can be coupled directly or indirectly by an intermediate medium. The specific meaning of the above terms in the present disclosure can be understood by the person skilled in the art according to specific circumstance.

For better understanding the present disclosure, embodiments of the present disclosure are described below in combination with FIGS. 1 to 20.

An embodiment of the present disclosure provides a device that uses a secondary battery 30 as a power source. The device can be, but is not limited to, a vehicle, a ship, an aircraft and the like. With reference to FIG. 1, an embodiment of the present disclosure provides a vehicle 1 including a vehicle body and a battery module. The battery module is disposed in the vehicle body. The vehicle 1 may be either a pure electric vehicle, or a hybrid electric vehicle or an extended-range vehicle. The vehicle body is disposed with a drive motor electrically connected with the battery module. The battery module provides electric energy to the drive motor. The drive motor is connected with wheels on the vehicle body through a transmission mechanism to drive the vehicle to travel. Optionally, the battery module may be horizontally disposed in the bottom of the vehicle body.

Figure 2:
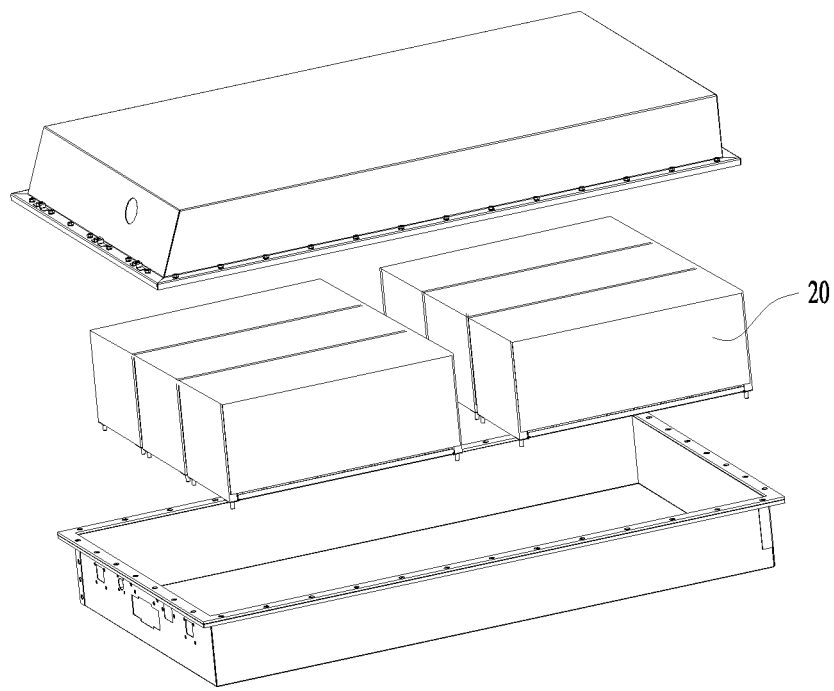
FIG. 2 is a schematic exploded diagram of a structure of a battery pack disclosed by an embodiment of the present disclosure.

With reference to FIG. 2, the battery module may be a battery pack 10. The battery pack 10 may be disposed in various ways. In some optional embodiments, the battery pack 10 includes a housing and a battery group 20 disposed in the housing. There are one or more battery groups 20. The one or more battery groups 20 are arranged in the housing.

The type of housing is not limited. The housing can be a frame-shaped housing, a disc-shaped housing, or a box-shaped housing. Optionally, the housing includes a lower housing for accommodating the battery group 20 and an upper housing covering and closing the lower housing. After the lower housing is covered and closed by the upper housing, an accommodating portion for accommodating the battery group 20 is formed. It may be understood that the battery module may also be the battery group 20, that is, the battery group 20 is directly disposed in the vehicle body.

Figure 3:
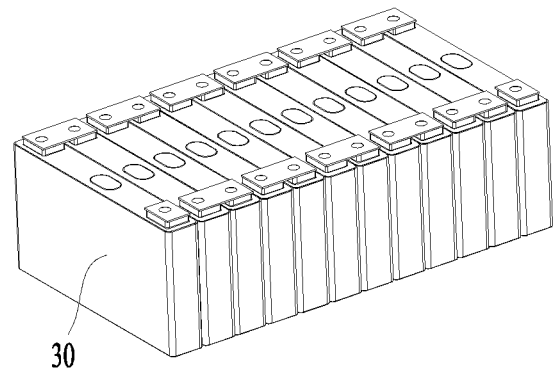
FIG. 3 is a schematic partial diagram of a structure of a battery group disclosed by an embodiment of the present disclosure.

With reference to FIG. 3, the battery group 20 includes a plurality of secondary batteries 30. The battery group 20 may be formed in various ways. In an embodiment, the battery group 20 includes the accommodating portion and the plurality of secondary batteries 30 located in the accommodating portion. The plurality of secondary batteries 30 are disposed side by side in the accommodating portion. The accommodating portion may be formed in various ways, for example, the accommodating portion includes a casing and a cover plate covering the casing; the accommodating portion includes side plates and end plates that are successively connected to enclose a space; or the accommodating portion includes two opposite end plates and a strap surrounding the end plates and the secondary batteries 30.

After noticing the problem of poor electrochemistry performance and safety performance of the existing secondary battery 30, the inventors researched and analyzed various structures of the secondary battery 30. Finally, the inventors found that a film and powder of an active material coated on the electrode plate of the electrode assembly are peeled off, thereby causing poor electrochemistry performance and safety performance of the secondary battery 30, and it was also verified practically that the reason why a phenomenon of peeling off the film and powder of the active material coated on the electrode plate occurs is that the electrode plate is subjected to external force during assembling the secondary battery 30.

Figure 4:
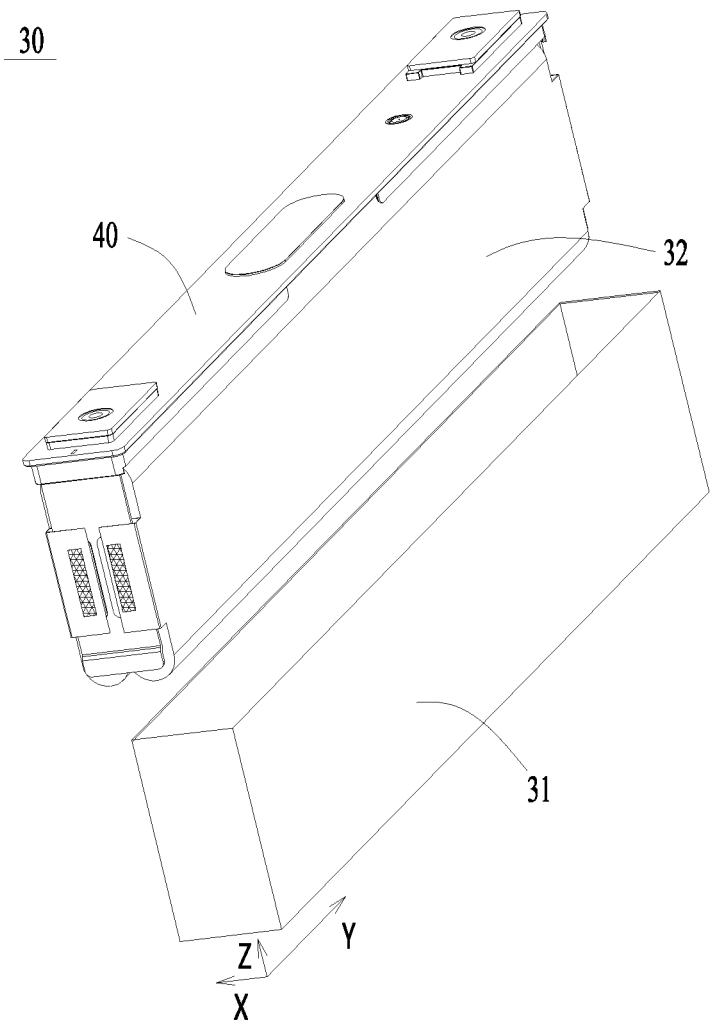
FIG. 4 is a schematic exploded diagram of a structure of a secondary battery disclosed by an embodiment of the present disclosure.
Figure 5:
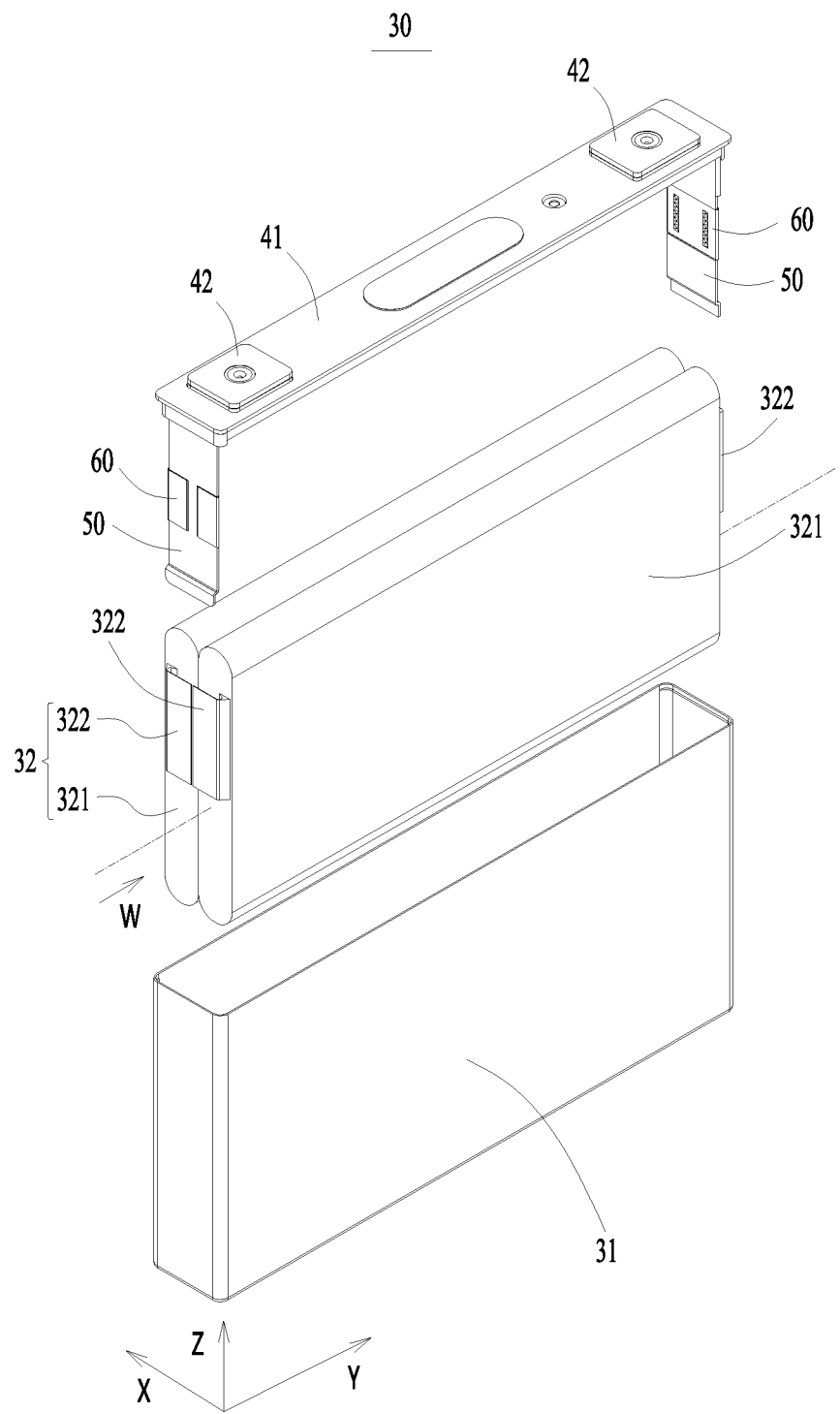
FIG. 5 is a schematic exploded diagram of a structure of a secondary battery disclosed by another embodiment of the present disclosure.

With reference to FIGS. 4 and 5, the secondary battery 30 of an embodiment of the present disclosure includes a casing 31, an electrode assembly 32 disposed in the casing 31, and a cap assembly 40 which is in sealed connection with the casing 31.

The casing 31 of an embodiment of the present disclosure has a square structure or other shape. The casing 31 includes an internal space for accommodating the electrode assembly 32 and electrolyte and an opening communicating with the internal space. The casing 31 may be made of aluminum, aluminum alloy, plastic, and the like.

The electrode assembly 32 of an embodiment of the present disclosure may have a main body 321 formed by stacking or winding a first electrode plate, a second electrode plate, and a separator located between the first electrode plate and the second electrode plate, wherein the separator is an insulator between the first electrode plate and the second electrode plate. The main body 321 of the present embodiment as a whole has a flat structure. The main body 321 has wide faces and narrow faces alternately disposed along its own circumferential direction. In embodiments of the present disclosure where the main body 321 is a wound structure, a thickness direction X of the secondary battery 30 refers to a direction perpendicular to the wide face, and a length direction Y refers to a direction parallel to a winding axis of the main body 321. The thickness direction X and the length direction Y each are perpendicular to the height direction Z. In an embodiment where the main body 321 is a laminated structure, the thickness direction X of the secondary battery 30 refers to a stacking direction of the first electrode plate, the separator, and the second electrode plate, and the length direction Y refers to a direction in which the tab 322 extends from the main body 321. The thickness direction X and the length direction Y each are perpendicular to the height direction Z. The main body 321 has two opposite end faces along its own axial direction W. The length direction Y of the secondary battery 30 is parallel to the axial direction W. The height direction Z of the secondary battery 30 is perpendicular to the axial direction W of the main body 321. In the present embodiment, the description is made by exemplarily taking a first electrode plate as the positive electrode plate and a second electrode plate as the negative electrode plate. A positive electrode active material is coated on a coated region of the positive electrode plate, while a negative electrode active material is coated on a coated region of the negative electrode plate. The plurality of uncoated regions extending from the coated regions of the main body 321 are stacked to serve as the tab 322. The electrode assembly 32 includes two tabs 322, that is, a positive tab and a negative tab. The positive tab extends from the coated region of the positive electrode plate, while the negative tab extends from the coated region of the negative electrode plate. In an embodiment of the present disclosure, one tab 322 extends from each of the two opposite end faces of the main body 321.

The cap assembly 40 of an embodiment of the present disclosure includes a cap plate 41 and an electrode terminal 42. The cap plate 41 of an embodiment of the present disclosure includes an outer surface and an inner surface opposite to each other along the height direction Z of the secondary battery 30 and an electrode leading-out hole extending along the height direction Z. The cap plate 41 can cover and close an opening of the casing 31 and is in sealed connection with the casing 31. The electrode terminal 42 is disposed on the cap plate 41 and corresponding to the electrode leading-out hole. A portion of the electrode terminal 42 is exposed on the outer surface of the cap plate 41 and is configured to be welded to a Bus-bar.

In the prior art, the current collecting member of an integrally formed structure includes a guiding section and a tab connecting section. The integrally formed structure means that the current collecting member as a whole is processed and manufactured, instead of being formed by splicing the guiding section and the tab connecting section. For example, the current collecting member of the integrally formed structure may be processed and manufactured by a processing method such as stamping, casting, or forging. For facilitating the manufacture, the guiding section and the tab connecting section are usually disposed to be the same thickness. By analyzing a assembling process of the secondary battery 30, it is known that during bending the tab 322 together with the tab connecting section of the current collecting member of the integrally formed structure with respect to the length direction Y, force first needs to be applied to an outer side of the tab 322 via a roller, so that the tab connecting section is gradually bent facing a surface of the guiding section away from the main body 321. After the tab connecting section is substantially bent in place, the tab 322 is then flattened by a flat structure. However, since the current collecting member is an integrally formed structure and a thickness of the tab connecting section is the same as a thickness of the guiding section, a rigidity of the tab connecting section is the same as a rigidity of the guiding section. In this way, when pressure is applied to the tab connecting section and the tab 322, stress will be directly transmitted to the guiding section through the tab connecting section of the current collecting member at the same time, thereby causing the guiding section to generate deformation along a direction close to the main body 321 and to press against the main body 321. In this way, pressure is applied to at least a portion of the electrode plate of the main body 321 by the guiding section, which easily causes the film or powder of the electrode plates coated with the active material to be peeled off due to mechanical force, thereby affecting the electrochemistry performance and safety performance of the secondary battery 30.

Based on the above-described problem found by the inventors, the structure of the secondary battery will be improved by the inventors, and the embodiments of the present disclosure will be further described below.

With reference to FIGS. 5 and 6, the secondary battery 30 of an embodiment of the present disclosure further includes a current collecting member. The current collecting member includes an adapting piece 50 and a connecting component 60. The adapting piece 50 and the connecting component 60 are provided separately and connected with each other, so that the adapting piece 50 and the connecting component 60 are assembled together to form the current collecting member. The connecting component 60 and the adapting piece 50 are individually processed and manufactured, and then connected with and fixed to each other through a mechanical connection manner. The mechanical connection manner may be welding. The adapting part 50 and the connecting component 60 form a weld portion 300 (specifically shown in FIG. 10) after being connected by welding. There may be two weld portions 300. The mechanical connection manner may also be riveting or bonding. A portion of the electrode terminal 42 is located on an inner surface side of the cap plate 41 and is connected with the adapting piece 50. In an embodiment, the adapting piece 50 is disposed on a side of the cap plate 41 close to the electrode assembly 32. The adapting piece 50 is connected with the connecting component 60. The connecting component 60 is connected with the tab 322 of the electrode assembly 32. In an example, the adapting piece 50 includes a terminal connecting section 51 and a guiding section 52. The terminal connecting section 51 and the guiding section 52 are connected and disposed to intersect with each other. The terminal connecting section 51 is electrically connected with the electrode terminal 42. The electrode terminal 42 does not extend beyond a surface of the terminal connecting section 51 away from the cap plate 41, thereby reducing the possibility of the electrode terminal 42 contacting and squeezing against the electrode assembly 32. The guiding section 52 of the adapting piece 50 is connected with the connecting component 60.

In an embodiment of the present disclosure, since the connecting component 60 is configured to have a rigidity less than that of the guiding section 52, the connecting component 60 is more easily deformed than the adapting piece 50, thereby reducing the deformation of the guiding section 52 toward the main body 321 when a connecting portion between the connecting component 60 and the tab 322 is bent with respect to the length direction Y. Here, the rigidity refers to an ability of a material or a structure to resist elastic deformation when being subjected to a force and is a characterization of the elastic deformation difficulty of the material or the structure. The connecting component 60 includes a current collecting section 61 and a tab connecting section 62. A portion of the connecting component 60 connected with the guiding section 52 is the current collecting section 61. A portion of the connecting component 60 connected with the tab 322 is the tab connecting section 62. In an example, with reference to FIGS. 5, 6, and 7, after the connecting component 60 and the adapting piece 50 are connected with each other and also the tab connecting section 62 of the connecting component 60 is connected with the tab 322, an external force is applied on the tab connecting section 62, so as to bend the tab connecting section 62 in an erected state with respect to the length direction Y facing a surface of the guiding section 52 away from the main body 321, that is, to bend the tab connecting section inwardly. The tab connecting section 62 bent in place is laminated with the guiding section 52. In another example, after the connecting component 60 and the adapting piece 50 are connected with each other and also the tab connecting section 62 of the connecting component 60 is connected with the tab 322, an external force is applied to the tab connecting section 62, so as to bend the tab connecting section 62 in the erected state with respect to the length direction Y facing a direction away from the guiding section, that is, to bend the tab connecting section 62 outwardly. The tab connecting section 62 bent in place and the guiding section 52 are disposed correspondingly along the thickness direction X. Optionally, a bending angle of the tab connecting section 62 is from 80° to 100°. In an embodiment of the present disclosure, since the connecting component 60 is more easily deformed than the guiding section 52, when the tab connecting section 62 and the tab 322 are bent together with respect to the length direction Y, external force which is transmitted to the guiding section 52 through the tab connecting section 62 is relatively small, thereby, during bending the tab connecting section, effectively reducing deformation degree of the guiding section toward the main body 321 of the electrode assembly 32 and thus deformation mount of the guiding section 52.

In an embodiment of the present disclosure, the adapting piece 50 and the connecting component 60 may adopt such a connection manner that they are separately provided and then assembled. For the adapting piece 50 and the connecting component 60 with different rigidities, the adapting piece 50 and the connecting component 60 may be processed and manufactured separately and then connected and fixed to form the current collecting member. Compared with a processing manner in which two regions with different rigidities are achieved simultaneously in the current collecting member of the integrally formed structure, the current collecting member of the embodiments of the present disclosure has low overall processing difficulty and processing cost. During bending the tab connecting section 62 together with the tab 322 and during flattening the tab 322 after it has been bent in place, external force which is transmitted to the guiding section 52 through the tab connecting section 62 is relatively small, thereby the deformation which is generated by the guiding section 52 having a larger rigidity than the rigidity of the connecting component 60 along a direction close to the main body 321 is relatively small, which effectively reduces the possibility of the guiding section 52 being in contact with the main body 321 and applying pressure to at least a portion of the electrode plate of the main body 321 and further reduces the possibility of the film or the powder of the electrode plate coated with the active material being peeled off due to the squeezing force from the main body 321, so as to improve the electrochemistry performance and safety performance of the secondary battery 30.

In an embodiment, a thickness H of the connecting component 60 is less than a thickness L of the guiding section 52, so that the rigidity of the connecting component 60 is less than the rigidity of the guiding section 52. The connecting component 60 and the guiding section 52 may be processed and manufactured using the same material, thereby reducing the types of materials to be processed and also facilitating their connection and fixation by welding. With a smaller thickness of the connecting component 60, the structure of the current collecting member formed by the connecting component 60 and the adapting piece 50 may be more compact, thereby saving more internal space of the secondary battery 30 and thus facilitating the increase of the battery energy density. In an example, the connecting component 60 has a single-layer structure.

In another embodiment, the hardness of the connecting component 60 is less than the hardness of the guiding section 52, so as to ensure that the rigidity of the connecting component 60 is less than the rigidity of the guiding section 52. In an example, the connecting component 60 has a single-layer structure. The thickness H of the connecting component 60 is equal to the thickness L of the guiding section 52, so as to ensure that the connecting component 60 has a good overcurrent ability even in a case that the connecting component 60 is easily deformed. In an example, the connecting component 60 is processed by annealing, so as to reduce the hardness of the connecting component 60. Since the connecting component 60 of the present embodiment can be separately processed and manufactured, it can be individually processed by annealing. For a current collecting member of the integrally formed structure in the prior art, it is difficult to process the tab connecting component by annealing so as to achieve a separate reduction in the rigidity of the tab connecting component. Optionally, the connecting component 60 and the guiding section 52 may be processed and manufactured using the same material, thereby reducing the types of material to be processed and also facilitating their connection and fixation by welding.

In another embodiment, the thickness H of the connecting component 60 is less than the thickness L of the guiding section 52 and the hardness of the connecting component 60 is less than the hardness of the guiding section 52, so as to ensure that the rigidity of the connecting component 60 is less than the rigidity of the guiding section 52. In a case that energy density of the electrode assembly 32 remains unchanged, the thickness of the connecting component 60 should not be too small, otherwise the overcurrent area of the connecting component 60 will be too small, thereby affecting the overcurrent ability of the connecting component 60. In present embodiment, as long as the thickness of the connecting component 60 ensures that the requirement for overcurrent area is met, the rigidity of the connecting component 60 may be reduced by the reduction of the hardness of the connecting component 60.

In an embodiment, with reference to FIGS. 7 and 8, the connecting component 60 includes two or more foils 60*a* that are laminated. The two or more foils 60*a* are laminated along a direction indicated by their own thickness. The thickness of each layer of foil 60*a* is less than the thickness of the guiding section 52, for example, a ratio of the thickness of each layer of foil 60*a* to the thickness of the guiding section 52 ranges from ¹⁄₁₀ to ½. The rigidity of each layer of foil 60*a* is less than the rigidity of the guiding section 52. In this way, compared with a single-layer tab connecting section 62 with the same thickness, external force which is required to bend the tab connecting section 62 formed by two or more foils 60*a* is smaller, thereby facilitating the further reduction of the external force carried by the tab connecting section 62 during bending and thus reducing the deformation generated by the guiding section 52 along the direction close to the main body 321. The connecting component 60 formed by laminating two or more foils 60*a* can reduce the rigidity of the connecting component 60 and also has a good overcurrent ability to meet the requirement for overcurrent.

Figure 9:
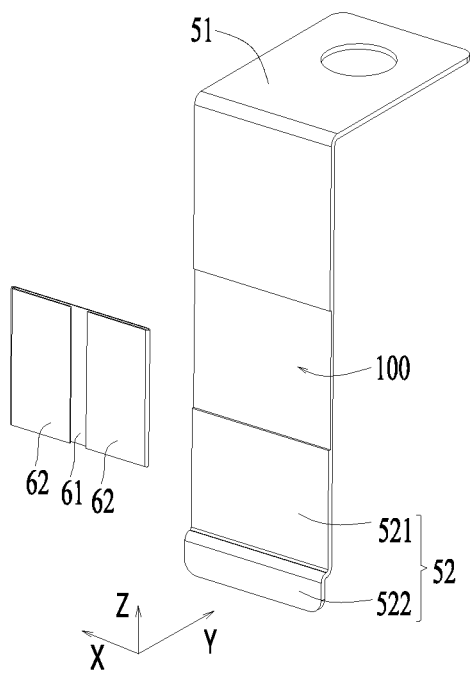
FIG. 9 is a schematic exploded diagram of a structure of a current collecting member disclosed by a further embodiment of the present disclosure.
Figure 10:
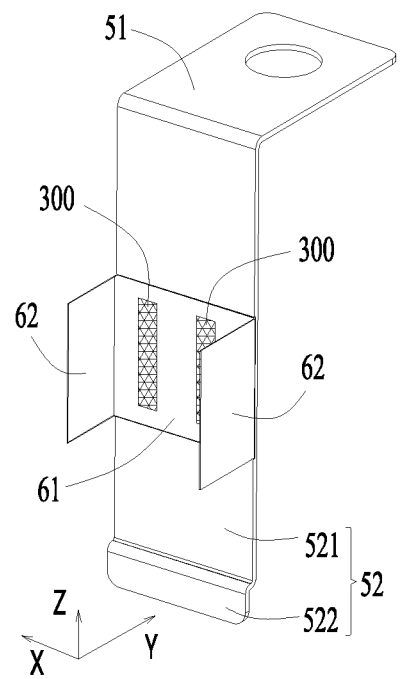
FIG. 10 is a schematic diagram of a state in which a connector and an adapting piece are connected disclosed by a further embodiment of the present disclosure.
Figure 11:
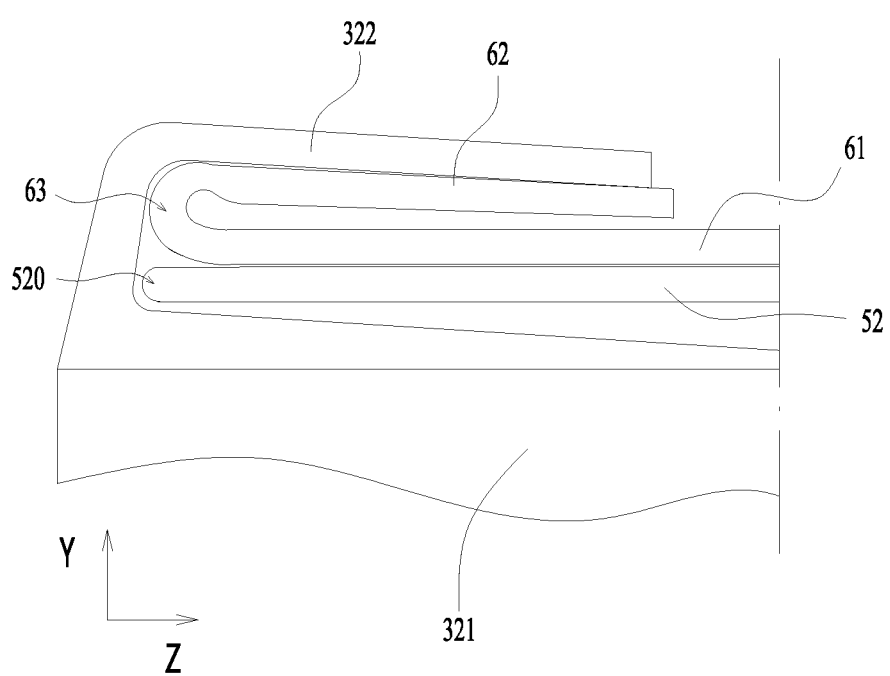
FIG. 11 is a schematic partial diagram of a structure of a state in which a current collecting member and an electrode assembly are connected disclosed by an embodiment of the present disclosure.
Figure 12:
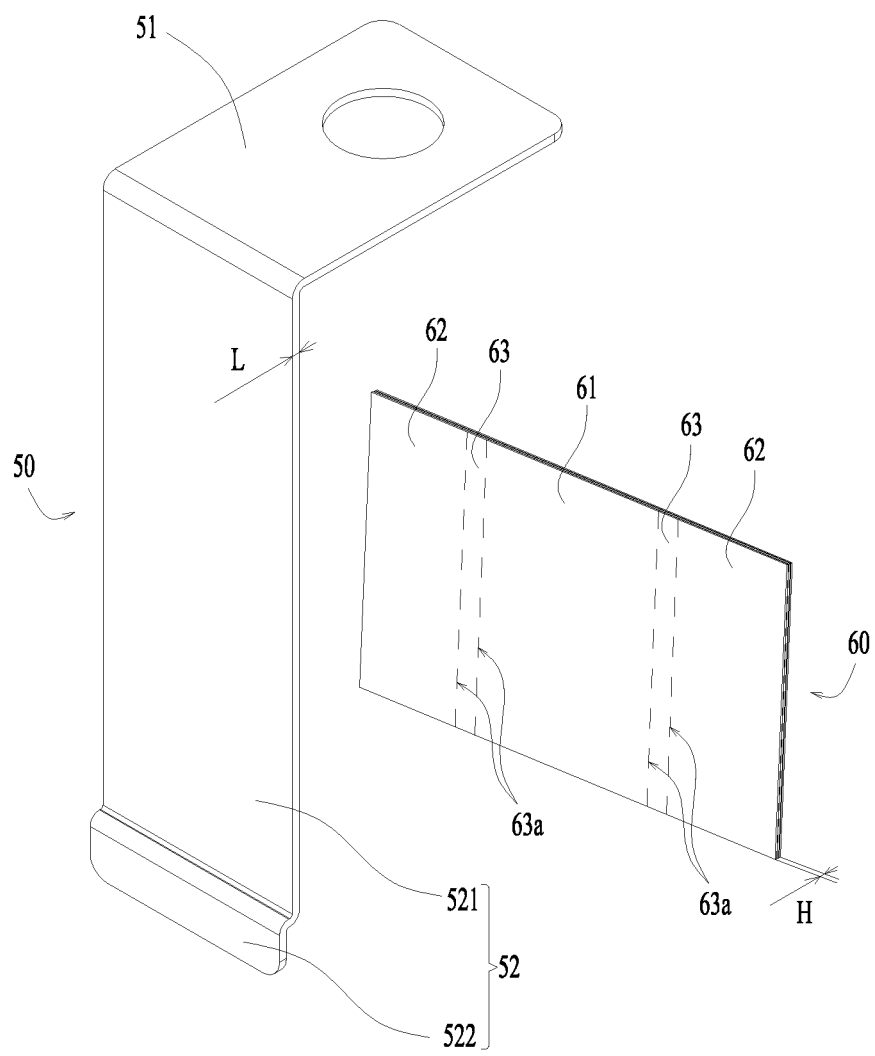
FIG. 12 is a schematic exploded diagram of a structure of a current collecting member disclosed by another embodiment of the present disclosure.
Figure 13:
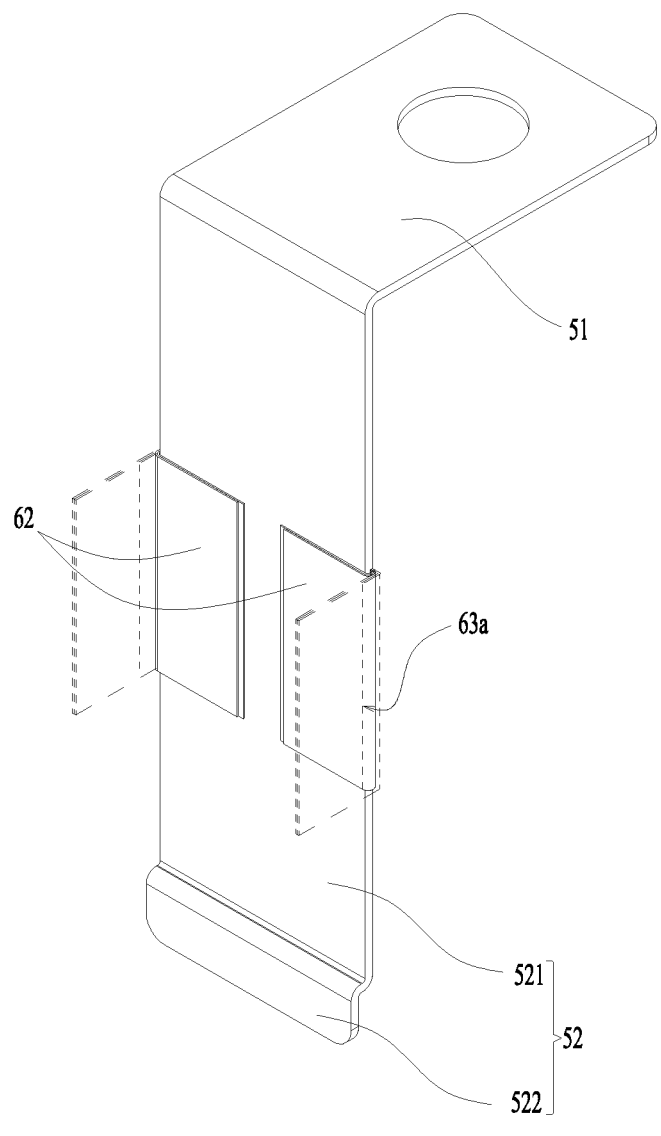
FIG. 13 is a schematic diagram of a state in which a connecting component and an adapting piece are connected disclosed by another embodiment of the present disclosure.
Figure 14:
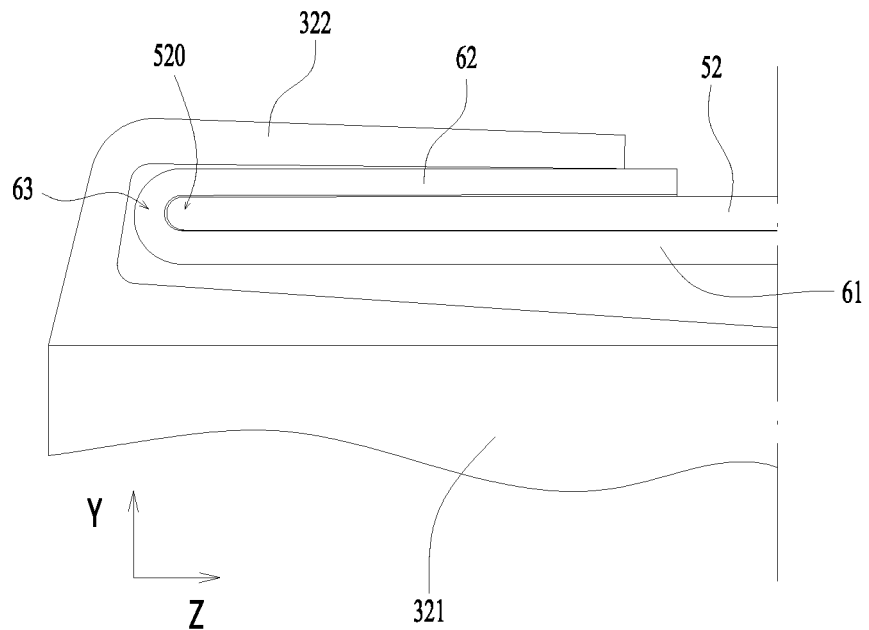
FIG. 14 is a schematic partial diagram of a structure of a state in which a current collecting member and an electrode assembly are connected disclosed by another embodiment of the present disclosure.

In an embodiment, with reference to FIGS. 9, 10 and 11, the guiding section 52 of the adapting piece 50 has two opposite edge portions 520 in the thickness direction X of the secondary battery 30. The thickness direction X of the secondary battery 30 is perpendicular to the axial direction W of the main body 321. The current collecting section 61 is connected with a surface of the guiding section 52 away from the main body 321. The current collecting section 61 of the connecting component 60 is connected with the surface of the guiding section 52 away from the main body 321 in advance. Then, the tab 322 and the tab connecting section 62 are connected and fixed. The tab 322 is connected with a surface of the tab connecting section 62 away from the main body 321. Then, the tab 322 and the tab connecting section 62 are bent together toward the surface of the guiding section 52 away from the main body 321. After the tab connecting section 62 is bent in place, the tab 322 is subjected to a flattening operation.

In an embodiment, with reference to FIG. 6, the connecting component 60 further includes a bend section 63. The bend section 63 connects the current collecting section 61 and the tab connecting section 62. After the tab connecting section 62 is bent, the bend section 63 is disposed around the guiding section 52. When external force is applied to the tab connecting section 62 to bend the tab connecting section 62, the connecting component 60 will be bent at the bend section 63, thereby after the bend section 63 is disposed, the connecting component 60 may be effectively guided to be bent in the bend section 63 region, thereby facilitating the accurate control on the bending position of the connecting component 60 and reducing the possibility of the bent position of the tab connecting section 62 which occurs during bending being not in a predetermined position.

With reference to FIG. 11, in an embodiment in which the current collecting section 61 is connected with the surface of the guiding section 52 away from the main body 321, since the position of a bend region of the tab connecting section 62 is not constrained by the guiding section 52 when bending the tab connecting section, a length of a crease line corresponding to the bend section 63 may be large after the tab connecting segment 62 is bent. Furthermore, under the action of elastic deformation force of the bent tab connecting section 62, a partial region of the tab connecting section 62 may be cocked along the direction away from the main body 321. In this way, on the one hand, the tab connecting section 62 will occupy too much space in the length direction Y, and on the other hand, due to the large length of the crease line of the bend section 63, the bend section 63 region is easily squeezed by external forces and thus deforms flatly, thereby causing an stress concentration region to easily occur in the bend section 63 region and structural damage such as crack or breakage occur in the stress concentration region. In an embodiment, with reference to FIGS. 12 to 14, the current collecting section 61 is disposed on an inner side of the guiding section 52. The inner side of the guiding section 52 refers to a side of the guiding section 52 close to the main body 321. The current collecting section 61 is located between the guiding section 52 and the main body 321. At least a portion of the tab connecting section 62 is bent on the side of the guiding section 52 away from the main body 321. The tab 322 is connected with a surface of the tab connecting section 62 away from the guiding section 52. The tab connecting section 62 surrounds the edge portion 520 of the guiding section 52 and then bends toward the surface of the guiding section 52 away from the main body 321. During bending the tab connecting section 62, the edge portion 520 of the guiding section 52 can constrain the location of the bend section 63, thereby facilitating the bend of the bend section 63 along a contour of the edge portion 520. An arc length of the bend region of the bent bend section 63 corresponding to the edge portion 520 is small, thereby causing a gap between the bend section 63 and the edge portion 520 to be small. In this way, on the one hand, both the tab connecting section 62 and the bend section 63 occupy less space in the length direction Y, thereby increasing energy density of the secondary battery 30; and on the other hand, due to the small arc length of the corresponding bend section 63, the bend section 63 is not easily deformed by compression when squeezed by external force, thereby reducing the possibility of the stress concentration region occurring in the bend section 63 and structural damage such as crack or breakage occurring in the stress concentration region. In an example, an outer surface of the edge portion 520 of the guiding section 52 is arc-shaped, thereby reducing the possibility of the stress concentration region occurring in the bend section 63 due to large stress locally generated in the bend section 63.

In an embodiment, at least a portion of the bend section 63 is in contact with the edge portion 520 of the guiding section 52, thereby on the one hand, a gap between the bend section 63 and the edge portion 520 is small, so that the bend region of the bend section 63 itself has a small arc length and occupies small space, thereby facilitating the increase of the energy density of the secondary battery 30; and on the other hand, a gap between a portion of the tab connecting section 62 close to the bend section 63 and the surface of the guiding section 52 away from the main body 321 is small. Preferably, the entire bend section 63 is in contact with the edge portion 520 of the guiding section 52. In an example, the bend section 63 has two boundaries 63a, one boundary 63a is close to the current collecting section 61, and the other boundary 63a is close to the tab connecting section 62. In an example, the boundary 63a close to the current collecting section 61 is located inwardly of the surface of the guiding section 52 close to the main body 321 or the boundary 63a close to the current collecting section 61 is flush with an edge of the edge portion 520 of the guiding section 52 away from the main body 321. In another example, the boundary 63a close to the tab connecting section 62 is located outwardly of the surface of the guiding section 52 away from the main body 321 or the boundary 63a close to the tab connecting section 62 is flush with an edge of the edge portion 520 of the guiding section 52 away from the main body 321. Optionally, the boundary 63a may be an indentation disposed on the connecting component 60.

In an embodiment, with reference to FIGS. 5 and 6, the connecting component 60 includes the current collecting section 61 and the tab connecting section 62. After the current collecting section 61 is connected and fixed to the guiding section 52 and the tab 322 is connected and fixed to the tab connecting section 62, the tab 322 and the tab connecting section 62 are bent together toward the surface of the guiding section 52 away from the main body 321. There are one or two or more electrode assemblies 32. Two or more electrode assemblies 32 may be disposed side by side along the thickness direction X. The wide face of one of the two adjacent electrode assemblies 32 corresponds to the wide face of the other thereof. In another embodiment, with reference to FIGS. 5 and 12, the connecting component 60 includes two tab connecting sections 62. Both sides of the current collecting section 61 along the thickness direction X of the secondary battery 30 are each disposed with one tab connecting section 62. The current collecting section 61 is disposed between the two tab connecting sections 62. The current collecting section 61 is connected and fixed to the guiding section 52. In an example, there are two electrode assemblies 32, the tab 322 of one electrode assembly 32 is connected and fixed to the corresponding tab connecting section 62, and the tab 322 of the other electrode assembly 32 is connected and fixed to the corresponding tab connecting section 62. Then, each tab connecting section 62 is bent toward the surface of the guiding section 52 away from the main body 321. In this way, the tabs 322 of the two electrode assemblies 32 are each connected with the corresponding tab connecting section 62, thereby reducing the difficulty of the connection of the tab 322 and the tab connecting section 62.

In an embodiment, with reference to FIGS. 5 and 9, the guiding section 52 has a recess 100. The recess 100 is recessed from the surface of the guiding section 52 away from the main body 321 along the direction close to the main body 321. At least a portion of the current collecting section 61 is accommodated in the recess 100, so that in the length direction Y of the secondary battery 30, the overall dimension of the current collecting section 61 and the guiding section 52 after being superimposed on each other is small. In another embodiment, with reference to FIGS. 15 and 16, the guiding section 52 has the recess 100. The recess 100 is recessed from the surface of the guiding section 52 facing the main body 321 along a direction away from the main body 321. At least a portion of the current collecting section 61 is accommodated in the recess 100, so that in the length direction Y of the secondary battery 30, the overall dimension of the current collecting section 61 and the guiding section 52 after being superimposed on each other is small. In this way, on the one hand, the structural compactness of the current collecting section 61 and the guiding section 52 is improved, thereby facilitating space saving, which increases the energy density of the secondary battery 30; and on the other hand, it is conducive to increasing an interval between the current collecting section 61 and the end face of the main body 321, thereby reducing, during bending the tab connecting section 62 or during flattening the tab 322 after bending, the possibility of the guiding section 52 and the current collecting section 61 being deformed together toward the main body 321 to cause the contact between the overcurrent section 61 and the main body 321 and a compressive stress applying on at least a portion of the electrode plate of the main body 321. In an example, the surface of the guiding section 52 facing the main body 321 is flush with the surface of the current collecting section 61 facing the main body 321, so that the entire current collecting section 61 is contained in the recess 100 of the guiding section 52, which facilitates the further increase of the interval between the current collecting section 61 and the end face of the main body 321.

In an example, with reference to FIGS. 16 to 19, the secondary battery 30 further includes an insulating component 70. The insulating component 70 is disposed between the guiding section 52 and the main body 321. The insulating component 70 covers at least a portion of the connection region between the current collecting section 61 and the guiding section 52, that is, in the length direction X, at least a portion of the current collecting section 61 is covered by the insulating component 70. Preferably, the insulating component 70 covers the entire current collecting section 61 and thus the connection region between the current collecting section 61 and the guiding section 52. The insulating component 70 isolates the current collecting section 61 from the main body 321. Optionally, the insulating component 70 has a lamellar structure. The insulating component 70 may be bonded to the current collecting section 61 and/or the guiding section 52. In an example, the insulating component 70 is accommodated in the recess 100 of the guiding section 52, which facilitates the improvement of the structural compactness and the reduction of the entire dimension of the insulating component 70, the current collecting section 61, and the guiding section 52 after superimposed upon one another in the length direction Y of the secondary battery 30, thereby facilitating space saving and thus improving the energy density of the secondary battery 30.

Figure 15:
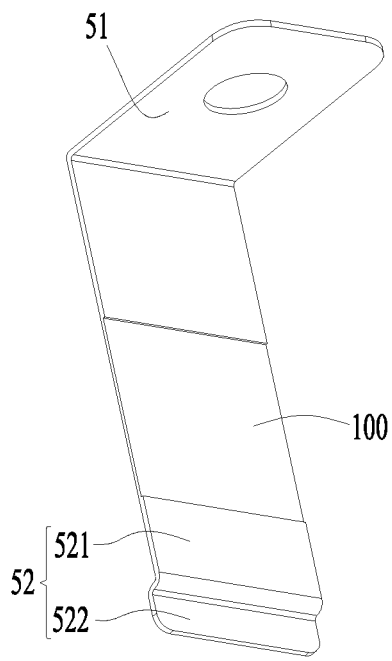
FIG. 15 is a schematic diagram of a structure of an adapting piece disclosed by a further embodiment of the present disclosure.
Figure 16:
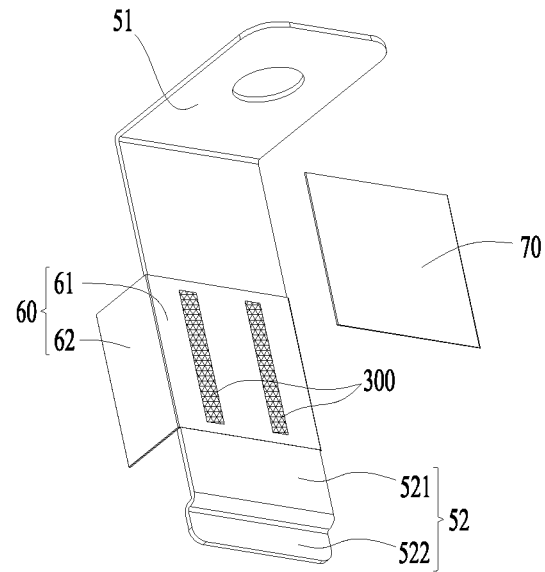
FIG. 16 is a schematic exploded diagram of structures of a current collecting member and an insulating component disclosed by a further embodiment of the present disclosure.
Figure 17:
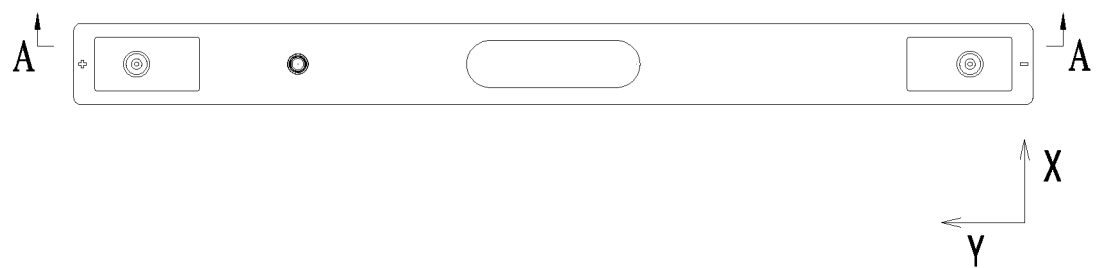
FIG. 17 is a schematic top view of a structure of a secondary battery disclosed by an embodiment of the present disclosure.
Figure 18:
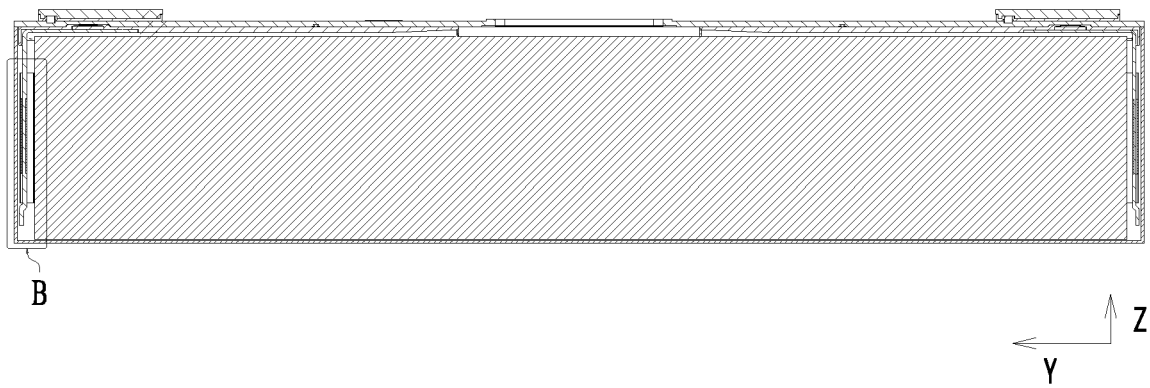
FIG. 18 is a schematic cross-sectional diagram of a structure taken along A-A in FIG. 17.
Figure 19:
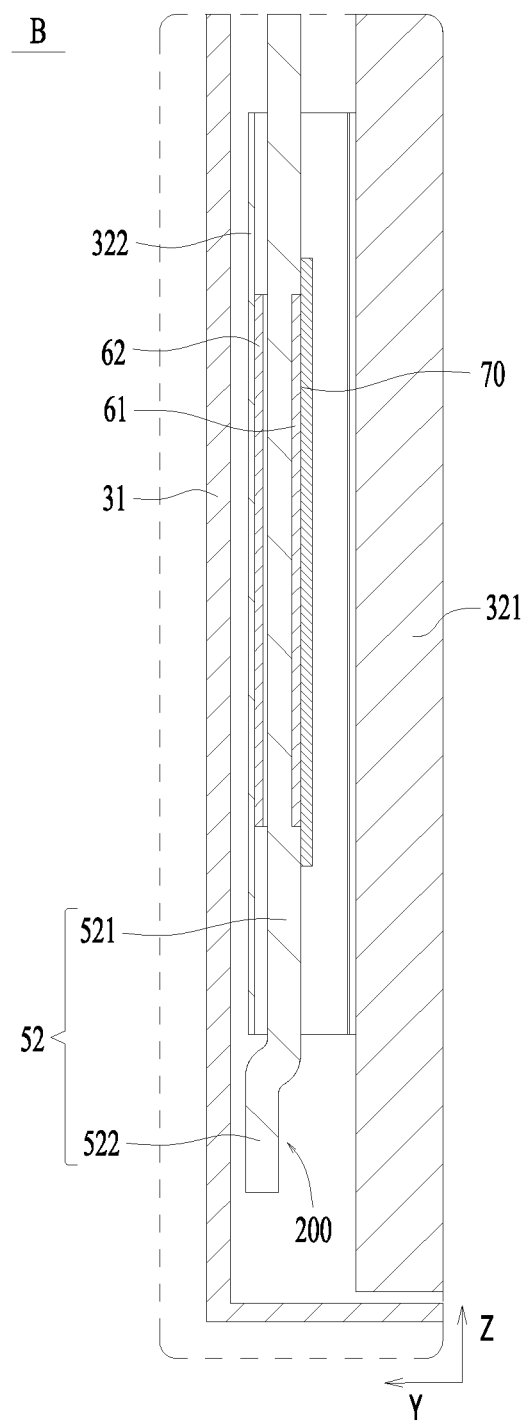
FIG. 19 is an enlarged diagram of B in FIG. 18.

In an embodiment, with reference to FIGS. 5, 15, and 19, the guiding section 52 includes a first region 521 and a second region 522 recessed in a direction away from the main body 321 relative to the first region 521. The first region 521 and the second region 522 are disposed in a direction away from the cap plate 41. The current collecting section 61 is connected with the first region 521. The guiding section 52 has an avoidance space 200 corresponding to the second region 522. When the tab connecting section 62 is bent or the tab 322 is flattened, a support tool is inserted into the avoidance space 200 to provide the guiding section 52 with a supporting force in a direction away from the main body 321 through the second region 522, thereby facilitating the further reduction of the deformation of the guiding section 52 toward the main body 321. The avoidance space 200 is disposed to improve the ease with which the support tool is inserted and also reduce the possibility of structural damage on the electrode plate due to the contact between the support tool and the electrode plate, which is caused by the contact between the support tool and the main body 321 during inserting due to a small interval between the guiding section 52 and the main body 321. In an example, in a direction away from the main body 321, the surface of the second region 522 away from the main body 321 protrudes from the surface of the tab 322 away from the tab connecting section 62.

Figure 20:
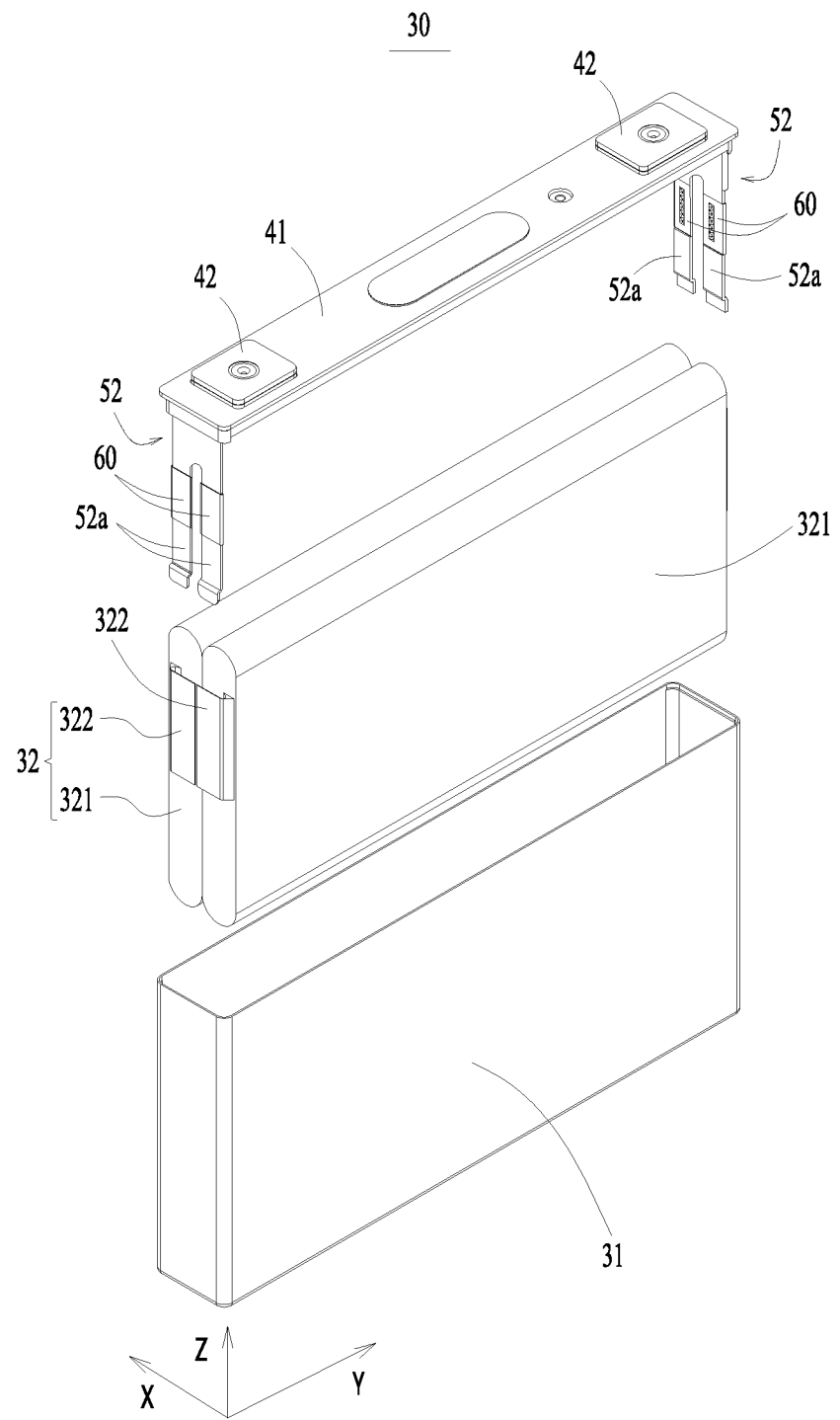
FIG. 20 is a schematic exploded diagram of a structure of a secondary battery disclosed by yet another embodiment of the present disclosure.

In an embodiment, with reference to FIG. 20, the guiding section 52 includes two branches 52a. The two branches 52a are disposed at intervals along the thickness direction X of the secondary battery 30. There is a gap between the two branches 52a. Each branch 52a is provided with one connecting component 60. For one of the branches 52a, after the tab connecting section 62 of the connecting component 60 is connected with the corresponding tab 322, during bending the tab connecting section 62 or flattening the tab 322, the branch 52a generates less disturbance on the stress of the other branch 52a, and it is not easy for the deformation of the branch 52a to cause the other foot 52a to produce the same deformation, thereby facilitating the further reduction of the deformation of the entire guiding section 52 along the direction close to the main body 321.

In an embodiment, the material of the adapting piece 50 is copper, copper alloy, aluminum, or aluminum alloy. The material of the connecting component 60 is copper, copper alloy, aluminum, or aluminum alloy.

The secondary battery 30 of an embodiment of the present disclosure includes the adapting piece 50 and the connecting component 60 that are separately disposed. The connecting component 60 is an intermediate transitional connecting component for connecting the guiding section 52 and the tab 322 of the electrode assembly 32. The connecting component 60 includes the current collecting section 61 and the tab connecting section 62. The current collecting section 61 is connected and fixed to the guiding section 52. The tab connecting section 62 is connected and fixed to the tab 322 of the electrode assembly 32. The rigidity of the connecting component 60 is less than the rigidity of the guiding section 52, and thus the connecting component 60 is more easily deformed than the guiding section 52. In this way, when the tab connecting section 62 and the tab 322 are bent together, external force acting on the guiding section 52 by transmitting to the guiding section 52 through the tab connecting section 62 is relatively small, thereby, during bending the tab connecting section 62, effectively reducing the deformation of the guiding section 52 toward the main body 321 of the electrode assembly 32, facilitating the reduction of the possibility of the film or powder of the electrode plate coated with the active material being peeled off due to the pressure applied by the guiding section 52, and thus improving the electrochemistry performance and safety performance of the secondary battery 30.

Although the present disclosure has been described with reference to preferred embodiments, various modifications can be made thereto and components therein can be replaced with equivalents without departing from the scope of the present disclosure. Especially, as long as there is no structural conflict, technical features mentioned in various embodiments can be combined in any manner. The present disclosure is not limited to the specific embodiments disclosed herein, but includes all technical solutions falling within the scope of the claims.

What is claimed is:

1. A secondary battery, comprising:
    a casing;
    an electrode assembly, disposed in the casing and comprising a main body and a tab extending from the main body;
    a cap assembly, comprising a cap plate and an electrode terminal disposed on the cap plate, the cap plate connected with the casing; and
    a current collecting member, comprising an adapting piece and a connecting component, the connecting component and the adapting piece provided separately and connected with each other, the adapting piece connected with the electrode terminal, and the adapting piece comprising a guiding section which is located on one side of the main body along a length direction of the secondary battery and extends along a direction perpendicular to the length direction,
    wherein the connecting component comprises a current collecting section and a tab connecting section, the current collecting section is configured to be connected with the guiding section, the current collecting section is disposed between the guiding section and the main body, the tab connecting section is configured to be connected with the tab, and the connecting component is configured to have a rigidity less than that of the guiding section, so that deformation of the guiding section toward the main body can be reduced when a portion of the connecting component connected with the tab is bent with respect to the length direction.

2. The secondary battery according to claim 1, wherein a thickness of the connecting component is less than a thickness of the guiding section.

3. The secondary battery according to claim 1, wherein a hardness of the connecting component is less than a hardness of the guiding section.

4. The secondary battery according to claim 3, wherein the connecting component was processed by annealing.

5. The secondary battery according to claim 1, wherein at least a part of the tab connecting section is bent on a side of the guiding section away from the main body, and the tab is connected with a surface of the tab connecting section away from the guiding section.

6. The secondary battery according to claim 1, wherein the connecting component further comprises a bend section which connects the current collecting section with the tab connecting section and is disposed to surround the guiding section.

7. The secondary battery according to claim 6, wherein at least a part of the bend section is in contact with an edge portion of the guiding section in a thickness direction of the secondary battery.

8. The secondary battery according to claim 1, wherein the connecting component comprises two tab connecting sections, which are respectively disposed on two opposite sides of the current collecting sections along a thickness direction of the secondary battery.

9. The secondary battery according to claim 1, wherein the guiding section and the current collecting section are disposed to be laminated, and connected and fixed by any one of welding, riveting, and bonding.

10. The secondary battery according to claim 1, wherein the guiding section comprises a recess which is recessed from a surface of the guiding section facing the main body along a direction away from the main body, and at least a part of the current collecting section is accommodated in the recess.

11. The secondary battery according to claim 10, wherein a surface of the guiding section facing the main body is flush with a surface of the current collecting section facing the main body.

12. The secondary battery according to claim 1, wherein the secondary battery further comprises an insulating component which is disposed between the guiding section and the main body and covers at least a part of a connection region between the current collecting section and the guiding section.

13. A battery module, wherein the battery module comprises a secondary battery according to claim 1.

14. A device for using a secondary battery as a power source, wherein the device comprises a secondary battery according to claim 1.

* * * * *